United States Patent Office 2,985,696
Patented May 23, 1961

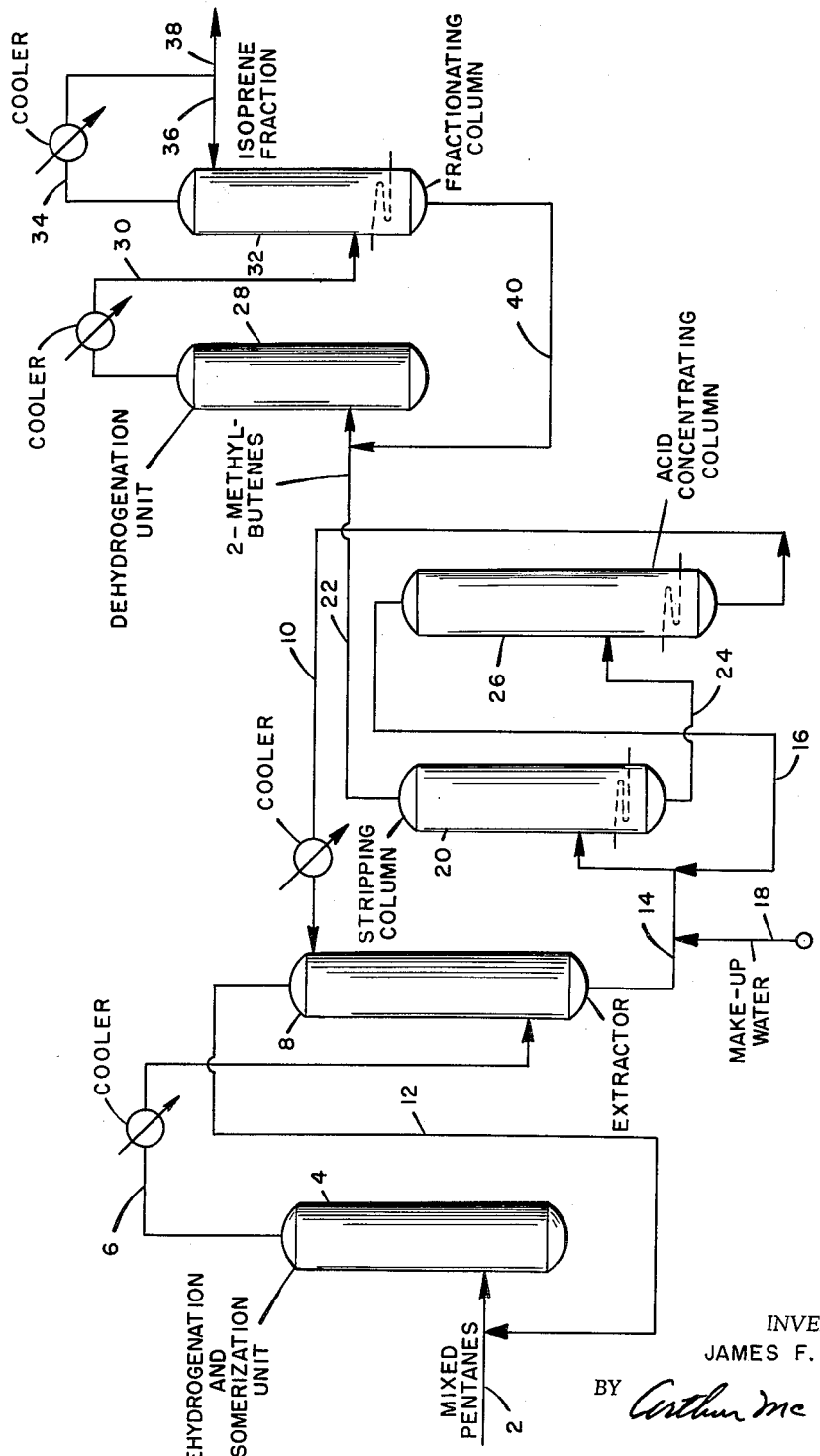

2,985,696

METHOD FOR MANUFACTURE OF ISOPRENE

James F. Magness, Tulsa, Okla., assignor, by mesne assignments, to Standard Oil Company, Chicago, Ill., a corporation of Indiana Filed Apr. 30, 1958, Ser. No. 732,044

3 Claims. (Cl. 260—680)

The present invention relates to the manufacture of isoprene. More particularly it is concerned with the preparation and recovery of isoprene from a readily available, relatively cheap source of supply.

The process of my invention is carried out in two dehydrogeneration steps. First a $C_5$ fraction obtained, for example, from natural gasoline or an equivalent source, is subjected to a combination dehydrogenation and isomerization treatment. The resulting mixture is next selectively extracted to separate the 2-methylbutenes, thus formed, from the remainder of the components present in the product mixture. Thereafter, the stream of 2-methylbutenes is introduced into a second dehydrogenation zone where said butenes are converted into the corresponding diolefin, i.e., isoprene.

Recently it has been discovered that polymers having characteristics very similar to those of natural rubber, can be made by polymerizing diolefins, such as isoprene, in the presence of certain catalysts having the ability to form high molecular weight polymers containing a high percentage of specific isoprene stereo-isomers. Such catalytic materials are usually referred to as stereospecific catalysts. This discovery has very appreciably increased the importance of providing industry with a practical and efficient method for the manufacture of isoprene. Presently the production of isoprene is limited to manufacture from refinery gases and other small volume sources. Moreover, the isoprene obtained from these sources is difficult to recover because it is found in the form of a mixture, together with some ten or twelve other $C_5$ hydrocarbons, all of which boil over a range of about 30° C. Six of these hydrocarbons boil within less than 10° C. of the boiling point of isoprene. Consequently, while isoprene can be recovered from such a source in a relatively pure condition, the number of steps and equipment required bring the cost up to a level which materially decreases the economic appeal of the above-mentioned new polymerization process, notwithstanding the desirable properties of the polymers made thereby.

Other procedures currently of interest for the preparation of isoprene involve the catalytic dehydrogenation of isopentane. Actually, production of isoprene from n-pentane is more desirable since the cost of isopentane is substantially greater than that of n-pentane or of mixtures of isopentane and n-pentane, such as occur in natural gasoline fractions. Production of isoprene from the normal isomer, however, is complicated by the fact that on dehydrogenation of n-pentane a large number of $C_5$ unsaturates, other than isoprene, are produced, thus requiring an expensive separation procedure for the recovery of the desired isoprene. As a matter of fact, even when using isopentane as the starting material, a substantial amount thereof is converted to undesirable derivatives through isomerization.

Accordingly, it is an object of my invention to provide a method for the manufacture of isoprene from a readily available cheap large volume source under conditions which involve first isomerizing and dehydrogenating a $C_5$ hydrocarbon feed stream, recovering the 2-methylbutenes thus produced, and thereafter subjecting said butenes to a further dehydrogenation step to produce the desired isoprene.

My invention will be further illustrated by reference to the accompanying flow diagram, wherein a $C_5$ fraction obtained from natural gasoline, for example, and consisting essentially of n-pentane and branched chain $C_5$ hydrocarbons, including isopentane, is introduced through line 2 into unit 4 in which these hydrocarbons are converted into olefins and isomerized. Whether isomerization occurs first followed by dehydrogenation or whether the two reactions occur simultaneously is unimportant insofar as the present invention is concerned.

The unit or reactor 4 contains, as a catalyst, alumina or an oxide derived from metals of groups IVB, VB or VIB of the periodic chart of the elements. The last-mentioned metal oxides are preferably deposited on a suitable support such as, for example, silica, silica-alumina, etc. Usually, the oxides of chromium, molybdenum and vanadium deposited on alumina, are preferred as the dehydrogenation components of my catalyst. While the isomerization component may consist of platinum oxide or platinum on a support, such as one of those mentioned above, other suitable isomerization catalysts may be prepared from a composite comprising a calcined precipitate of hydrous silica and hydrous alumina. Also, isomerization catalysts which have, as their chief components, an alkali-free hydrous silica, may be used. Additionally, hydrous zirconia may be combined with hydrous silica to form the active components of the isomerization catalyst employed. Such materials are highly active and thermally stable at the temperatures encountered. These catalysts may be prepared by forming a composite mass of silica hydrogel and alumina or zirconia hydrogel, followed by drying and calcining at 800° to 1,500° F.

The temperature range employed in this combination dehydrogenation-isomerization step, may in general range from about 900° to about 1,100° F., preferably from about 950 to about 1,050° F., at a pressure of from about 2 to about 4 p.s.i.a.

From the dehydrogenation and isomerization unit 4, the mixture of converted and unconverted material is taken off through line 6, condensed and the resulting liquid sent to extractor 8, where said mixture is countercurrently contacted with a stream of a selective solvent for 2-methylbutenes, such as sulfuric acid of about 60 to about 75 weight percent strength and preferably in a concentration of from about 65 to about 70 weight percent. Under these conditions a regenerable complex is formed by reaction of sulfuric acid with the branched chain olefins in said mixture. The extraction step may be effected from about 50° up to about 100° F. While the reaction involved in the formation of the aforesaid complex reaches equilibrium more rapidly at a temperature of 100° F., the reaction is not as complete at this temperature level as it is at temperatures of 60° to 70° F. Accordingly, for higher recovery yields of isoprene, I prefer to employ the lower temperature range and to effect the extraction of the 2-methylbutenes in the presence of adequate agitation.

In effecting the extraction step, a 65 weight percent solution of sulfuric acid flows through line 10 at about 50° F. into extractor 8. The rising mixture of straight and branched chain olefins and paraffins contacts the descending stream of sulfuric acid which selectively extracts the branched olefins. The temperature at which this operation is carried out is preferably maintained at about 60° F. Refrigeration is ordinarily required to hold the extracton zone at this level.

Raffinate, which consists chiefly of paraffins and straight chain olefins, is taken overhead through line 12 and added to the feed stream in line 2. The extract from the extraction step is withdrawn through line 14 and consists essentially of the aforesaid complex of 2-methylbutene-1 and 2-methylbutene-2. In order to liberate these olefins from sulfuric acid, the extract in line 14 is diluted, preferably to a sulfuric acid concentration of about 45 weight percent, by the addition of aqueous distillate from a subsequent operation in line 16. Additional water, if needed, may be added to the system through line 18. This diluted mixture is then passed into stripping column 20 where a bottoms temperature of about 240°–250° F. is employed, preferably at atmospheric pressure. Under these conditions the two desired isomers, i.e., 2-methylbutene-1 and 2-methylbutene-2, are removed through line 22, at an overhead temperature of from about 170° to 180° F.

The dilute sulfuric acid bottoms in stripping column 20 is transferred to an acid concentration column 26 via line 24 where excess water is taken overhead through line 16 until the concentration of sulfuric acid in the bottoms reaches about 65 weight percent. This operation is generally carried out at a bottoms temperature of about 310° F. The resulting concentrated acid is then withdrawn through line 10, cooled to about 50° F. and recycled to extractor 8.

The stream of 2-methylbutenes in line 22 is then sent to a second dehydrogenation unit 28 where these olefins are converted into isoprene. One of the outstanding features of my invention resides in the fact that I am able, by the previous steps outlined above, to supply a feed to said second dehydrogenation unit consisting substantially entirely of components which can be readily converted into isoprene. By the use of a feed having such purity for this particular dehydrogenation stage, the possibility of undesirable side reactions, so characteristic of prior art processes, is held to a minimum.

The catalyst employed in dehydrogenation unit 28 may be any of a number of well-known materials used for that purpose and which have been previously recited. Chromia on alumina is typical of the catalyst which may be suitably employed at this stage. The temperature employed in this second dehydrogenation stage may range from about 1,000° to about 1,200° F.; however, the preferred range may be quite narrow, typically 1,050° to 1,075° F. Operating pressures are preferably maintained from about 2 to about 4 p.s.i.a.

Space velocities employed within the temperature ranges specified for both dehydrogenation units 4 and 28 may range from about 200 to about 2,000 volumes of gas per volume of catalyst per hour.

The mixture obtained from dehydrogenation unit 28 is withdrawn through line 30, cooled and transferred to fractionating column 32, operating at an overhead temperature of about 94° F., whereby isoprene and lower boiling components are taken off via line 34. A portion of the distillate in line 34 is returned to column 32 as reflux via line 36, while the bulk of this stream, containing chiefly isoprene, is recovered through line 38. Because of the wide difference in the boiling points of the product isoprene and the impurities in this stream, most of which are much lower boiling than isoprene, the latter can be purified by much less involved procedures than are required for the purification of isoprene streams obtained by conventional processes. The bottoms obtained in this operation consists primarily of unconverted olefins and is recycled to dehydrogenation unit 28 via lines 40 and 22.

As is well-known to the art, the catalyst beds employed in both dehydrogenation steps must be periodically regenerated by successive treatments with steam, air and steam, after which the production cycle may be resumed.

The catalyst used in either of the dehydrogenation steps required may be in the form of fixed or fluid beds. Thus, in the case of a fixed bed, several alternative methods of operation may be used in the catalyst zone, for example, alternative methods of distributing the catalyst in the reaction zone may be employed. Thus, the catalysts in dehydrogenation and isomerization unit 4 may be distributed in alternate layers throughout the depth of the bed or the two catalysts may be physically mixed so that uniform distribution of both of them is obtained throughout the zone. On the other hand, it may be desired to distribute the dehydrogenating oxide, such as chromia, upon the isomerizing catalyst as a support. It is seen, therefore, that various methods may be used for dispersing both catalysts throughout the reaction zone in unit 4.

In the event a fluid bed is employed, either a mixture of powdered dehydrogenation catalyst with powdered isomerization catalyst may be used, or the dehydrogenating oxide may be distributed upon the silica-alumina hydrogel isomerizing catalyst, thereby producing a catalyst which will effect both reactions.

The catalyst used in dehydrogenation unit 28 is, of course, a single purpose catalyst, i.e., dehydrogenation, and likewise may be used in the form of either fixed or fluid beds.

The process of my invention may be further illustrated by the following example:

*Example*

A $C_5$ natural gasoline fraction containing approximately 50 percent normal paraffins and about 50 percent branched chain paraffins, is subjected to simultaneous dehydrogenation and isomerization conditions by contacting the vapors of this feed with a composite catalyst of chromia-alumina and platinum oxide at a temperature of about 1,000° F. at an absolute pressure of about 3 p.s.i. and at a space velocity of about 500 volumes of gaseous feed per volume of catalyst per hour, measured at standard conditions. The product resulting from this treatment is then subjected to countercurrent extraction with a 65 weight percent sulfuric acid solution at a temperature of about 60° F. The raffinate from this extraction step is recycled to the feed going to the above-mentioned dehydrogenation-isomerization step. The extract thus obtained is diluted with water to give a sulfuric acid concentration of about 45 weight percent and the resulting diluted mixture subjected to a stripping operation at about 180° F., whereby the 2-methylbutenes, combined with the sulfuric acid during the extraction step, are liberated and taken overhead. The dilute sulfuric acid is concentrated to about 65 percent strength, cooled to about 50° F. and recycled to the aforesaid acid extraction step. The 2-methylbutenes, obtained as a result of the previously mentioned acid stripping operation, are then sent to a second stage dehydrogenation operation where the gas velocity and pressure are approximately the same as those employed in the aforementioned dehydrogenation and isomerization step. The catalyst used at this stage is primarily a dehydrogenation catalyst, i.e., chromia-alumina. The temperature used in this second dehydrogenation operation, however, is somewhat higher, being of the order of about 1,050° F. The resulting effluent from the last-mentioned dehydrogenation step is then sent to a fractionation system where product isoprene is recovered in high yield. Monoolefins separated during the isoprene recovery step are recycled and combined with the 2-methylbutene feed going to the second dehydrogenation stage.

I claim:

1. In a process for the manufacture of isoprene from a $C_5$ paraffin hydrocarbon by dehydrogenation of the latter, the improvement which comprises introducing a mixture consisting essentially of branched and straight chain $C_5$ paraffin hydrocarbons into a reaction zone under conditions favorable to the dehydrogenation of said hydrocarbons and to the isomerization of the olefins resulting therefrom, contacting said mixture in said zone with a composite mass consisting essentially of a chromia-containing dehydrogenation catalyst and platinum-derived isomerization catalyst, withdrawing a product mixture containing a 2-methylbutene from said zone, recovering from said product mixture by extraction with an aqueous sulfuric acid solution an extract stream consisting essentially of a 2-methylbutene and a raffinate stream consisting chiefly of paraffins and straight chain olefins, recycling said raffinate stream to said dehydrogenation-isomerization reaction zone next bringing said extract stream into contact with a chromia-containing dehydrogenation catalyst in a second reaction zone under conditions favorable for the dehydrogenation of said 2-methylbutene to isoprene, withdrawing the resulting product mixture containing isoprene and mono-olefins, recovering isoprene therefrom, and recycling said mono-olefins to said second reaction zone.

2. A process for the manufacture of isoprene comprising contacting a feed mixture consisting essentially of isopentane and normal pentane in a first reaction zone with a composite catalyst consisting of a chromia-alumina dehydrogenation catalyst and a platinum-derived isomerization catalyst under conditions to produce a first product mixture containing pentenes and including 2-methylbutene, withdrawing from said first reaction zone said first product mixture, subjecting said first product mixture to extraction with an aqueous sulfuric acid solution, liberating said 2-methylbutene from the resulting extract, recycling the resulting raffinate to said first reaction zone, and thereafter contacting said liberated 2-methylbutene with a chromia-alumina dehydrogenation catalyst under conditions to produce a second product mixture containing isoprene, recovering isoprene from said second product mixture and recycling the remainder of said second product mixture to said second reaction zone.

3. A process for the manufacture of isoprene comprising contacting a feed mixture consisting essentially of isopentane and normal pentane in a first reaction zone with a composite chromia-alumina dehydrogenation catalyst and a platinum oxide isomerization catalyst at a temperature ranging from about 900° F., to about 1100° F. at a pressure of from about 2 to about 4 p.s.i.a., at a space velocity ranging from about 200 to about 2000 volumes of gas per volume of catalyst per hour, withdrawing from said first reaction zone a first product mixture containing a 2-methylbutene, subjecting said product mixture to extraction with an aqueous 60–75% (wt.) sulfuric acid solution, at a temperature of about 50–100° F. liberating a 2-methylbutene from the resulting extract, recycling the resulting raffinate to said feed mixture, thereafter contacting said liberated 2-methylbutene with a dehydrogenation catalyst consisting essentially of chromia-alumina in a second reaction zone at a temperature between about 1000° F. and 1200° F. and a pressure of about 2 to 4 p.s.i.a. and a space velocity of about 200 to about 2000 volumes of gas per volume of catalyst per hour to dehydrogenate said 2-methylbutene to isoprene, withdrawing and fractionating the resulting second product mixture from said second reaction zone to recover isoprene therefrom and recycling the remainder of said second product mixture to said second reaction zone.

References Cited in the file of this patent
UNITED STATES PATENTS

| | | |
|---|---|---|
| 2,346,657 | Bloch et al. | Apr. 18, 1944 |
| 2,391,160 | Hillman et al. | Dec. 18, 1945 |
| 2,394,625 | Matuszak | Feb. 12, 1946 |
| 2,421,506 | Jones | June 3, 1947 |
| 2,515,006 | Hudson | July 11, 1950 |
| 2,831,908 | Starnes et al. | Apr. 22, 1958 |